United States Patent [19]

Nakakita et al.

[11] Patent Number: 5,054,531
[45] Date of Patent: Oct. 8, 1991

[54] PNEUMATIC RADIAL TIRE WITH 1×2 STEEL BELT CORD STRUCTURE

[75] Inventors: Issey Nakakita; Hisao Kato, both of Hiratsuka, Japan

[73] Assignee: The Yokohama Rubber Co., Ltd., Tokyo, Japan

[21] Appl. No.: 608,425

[22] Filed: Nov. 2, 1990

[30] Foreign Application Priority Data

Nov. 13, 1989 [JP] Japan .................................. 1-292385

[51] Int. Cl.⁵ .......................... B60C 9/00; B60C 9/18; B60C 9/20
[52] U.S. Cl. .................................. 152/527; 152/451; 152/526
[58] Field of Search ............... 152/527, 556, 526, 548, 152/451

[56] References Cited

U.S. PATENT DOCUMENTS

| | | | |
|---|---|---|---|
| 1,470,924 | 10/1923 | Jury | 152/526 X |
| 1,689,119 | 10/1928 | Evans | 152/527 X |
| 3,665,993 | 5/1972 | Wittneben | 152/556 |
| 4,722,381 | 2/1988 | Hopkins et al. | 152/527 |
| 4,749,017 | 6/1988 | Loesch | 152/527 |

FOREIGN PATENT DOCUMENTS

| | | | |
|---|---|---|---|
| 0212734 | 1/1961 | Austria | 152/526 |
| 0505019 | 7/1920 | France | 152/556 |
| 0568042 | 3/1924 | France | 152/556 |

*Primary Examiner*—Caleb Weston
*Assistant Examiner*—Adrienne C. Johnstone
*Attorney, Agent, or Firm*—Armstrong, Nikaido, Marmelstein, Kubovcik & Murray

[57] ABSTRACT

A pneumatic radial tire having at least one steel belt layer disposed at a tread portion, wherein each steel belt layer is constituted by mixing and arranging at random a plurality of steel cords having a 1×2 twist structure of an S twist and a plurality of steel cords having a 1×2 twist structure of a Z twist, and has a mixing ratio of the steel cords having the 1×2 twist structure of the S twist to the steel cords having the 1×2 twist structure of the Z twist within a range of 4:6 to 6:4 and a difference in the twist pitch of at least 1.5 mm.

3 Claims, 3 Drawing Sheets

FIG. 2A
FIG. 2B
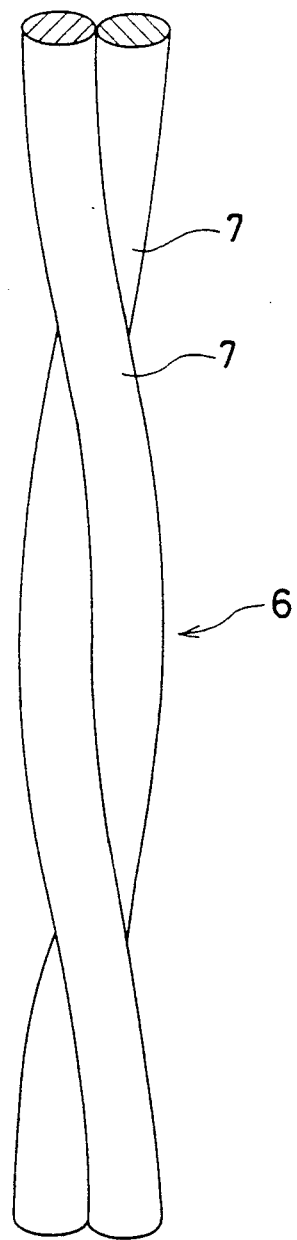
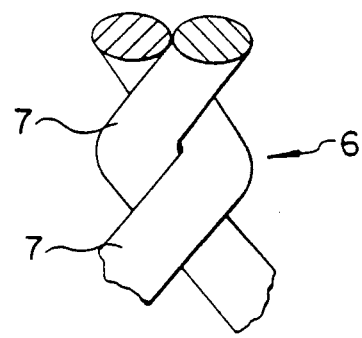

PNEUMATIC RADIAL TIRE WITH 1×2 STEEL BELT CORD STRUCTURE

BACKGROUND OF THE INVENTION

This invention relates to a pneumatic radial tire whose tread portion is reinforced by steel belt layers, and more particularly, to a pneumatic radial tire which exhibits an excellent belt durability though its steel belt layers use steel cords having a 1×2 twist structure.

Steel cords have a higher strength and a higher elastic modulus than other tire cords consisting of organic fibers. For this reason, the steel cords have found a wide application as reinforcing cords for belt layers for reinforcing the tread portion of radial tires. Conventionally, steel cords used for this steel belt layer have predominantly been of a 1×4 twist structure obtained by twisting four strands with one another and of a 1×5 twist structure obtained by twisting five strands with one another. However, as requirements for a further reduction of the weight of tires and the cost of the tire production have increased in recent years, a more simplified twist structure of steel cords for use for the steel belt layer than the conventional 1×4 twist structure and 1×5 twist structure has been increasingly sought.

The ultimate twist structure by the requirements described above is a 1×2 twist structure obtained by twisting only two strands with each other. According to this 1×2 twist structure, the number of strands is smaller, the weight can be reduced and the twisting step, too, can be simplified, so that the cost of production can be reduced, too. Furthermore, since this 1×2 twist structure permits high permeability by coating rubber, rust-proofness and separation resistance to rubber can be made better.

However, this 1×2 twist structure is the one in which two strands are merely twisted with each other. Therefore, the cross-sectional shape becomes elliptic as shown in FIG. 3 and the ratio of its maximum diameter a to its minimum diameter b becomes as great as 2:1. This means that a great difference occurs in the bending rigidity between when the steel cord is bent in the direction of the minimum diameter and when it is bent in the direction of the maximum diameter and when it is bent in the direction of the maximum diameter. If a steel belt layer is produced from the steel cords having such a great difference between the maximum diameter and the minimum diameter, steel cords which are adjacent to one another are likely to have same twist phases aligned with one another and there occurs a phenomenon in which portions having maximum diameters or portions having minimum diameters are aligned over a wide range in a direction crossing orthogonally the longitudinal direction of the steel cords when the steel belt layer is viewed on a plane. For example, FIG. 4 is an X-ray photograph of a steel belt layer produced by burying steel cords having a 1×2 twist structure of S twist into coating rubber. As can be seen, the portion in which maximum diameter portions are aligned with one another over a considerable width is found in a region A which is encompassed by chain lines among a plurality of steel cords 6 aligned parallel to one another.

If the same maximum diameter portions are aligned over a wide range in the steel belt layer, the flexural rigidity of this portion becomes extremely smaller than that of the portion where the minimum diameter portions are aligned, so that the out-plane flexural rigidity at this portion becomes extremely smaller than that at the other portion. Accordingly, when a large bending load is applied to a steel belt layer during heavy cornering or the like of a tire having such steel belt layer, the portion having a lowest rigidity, where the maximum diameter portions are aligned mutually, is easily bent and broken.

The inventors of the present invention examined in detail the steel belt layer comprising steel cords having the 1×2 twist structure and found out that the cause of the alignment of the twist phases between the adjacent steel cords described above results from the following phenomenon when the belt layer is produced from steel cords by calendering: a plurality of steel cords are passed through a die and are aligned in a reed-screen form at the time of calendering but the steel cords oscillate immediately ahead of the die and are in rotary motion with the longitudinal direction of the axis. When a plurality of steel cords are each in rotary motion in this manner, the rotations of the adjacent steel cords resonate and the twist phases are aligned. Moreover, since the difference between the maximum diameter and the minimum diameter of the sectional shape of the steel cord having the 1×2 twist structure is great, resonance of rotations is induced all the more easily and the twist phases are more likely to be aligned. Furthermore, since the steel cord having the 1×2 twist structure has a lower rigidity than the conventional steel cords having the 1×4 or 1×5 twist structure, an end count to be used for the steel belt layer must be made greater than that of the conventional steel belt layers. For this reason, resonance is induced all the more easily and the alignment of the twist phases is more likely to occur.

SUMMARY OF THE INVENTION

It is an object of the present invention to provide a pneumatic radial tire having at least one steel belt layer comprising steel cords of a 1×2 twist structure as reinforcing belt structure for its tread portion.

It is another object of the present invention to provide a pneumatic radial tire which improves the belt durability by preventing the alignment of the twist phases between the adjacent steel cords when a steel belt layer is constituted by the steel cords of a 1×2 twist structure.

In order to accomplish the objects described above, the pneumatic radial tire in accordance with the present invention includes at least one belt layer for the belt structure, made by mixing and arranging at random a plurality of steel cords having 1×2 twist structure of S twist and a plurality of steel cords having a 1×2 twist structure of Z twist. Furthermore, the mixing ratio of the steel cords having the 1×2 twist structure of the S twist to the steel cords having the 1×2 twist structure of the Z twist is set to be within a range of 4:6 to 6:4 and the difference between their twist pitches is set to be at least 1.5 mm.

When the two kinds of steel cords having the mutually different twist directions, that is, the S twist and the Z twist, are mixed at random at a mixing ratio of 4:6 to 6:4, a resonant rotary motion which occurs between adjacent steel cords at the time of calendering can be reduced and when the difference between the twist pitches of both kinds of steel cords is set to be at least 1.5 mm, the resonant rotary motion described above can be prevented substantially completely.

BRIEF DESCRIPTION OF THE DRAWINGS

FIG. 2A is a perspective view of steel cords having a 1×2 twist of an S twist to be used in the present invention;

FIG. 2B is a perspective view of steel cords having the 1×2 twist structure of a Z twist to be used in the present invention;

DESCRIPTION OF THE PREFERRED EMBODIMENT

Figure 1:
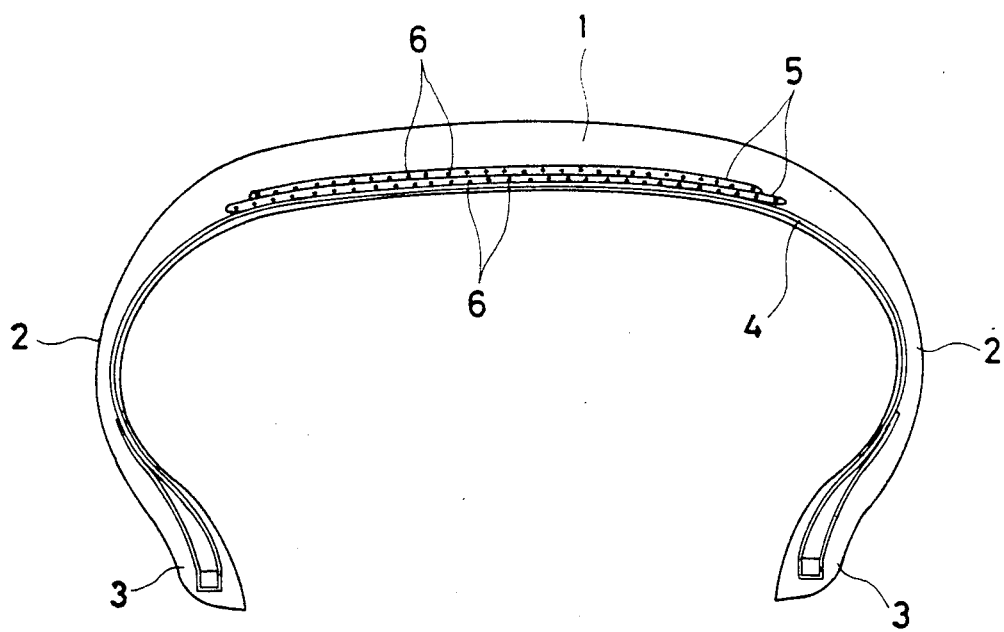
FIG. 1 is a longitudinal sectional view of a pneumatic radial tire in accordance with an embodiment of the present invention.
Figure 3:
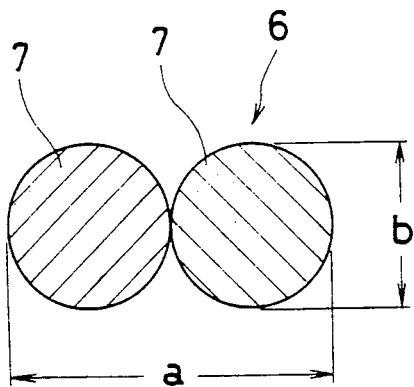
FIG. 3 is a transverse sectional view of steel cords having the 1×2 twist structure.
Figure 4:
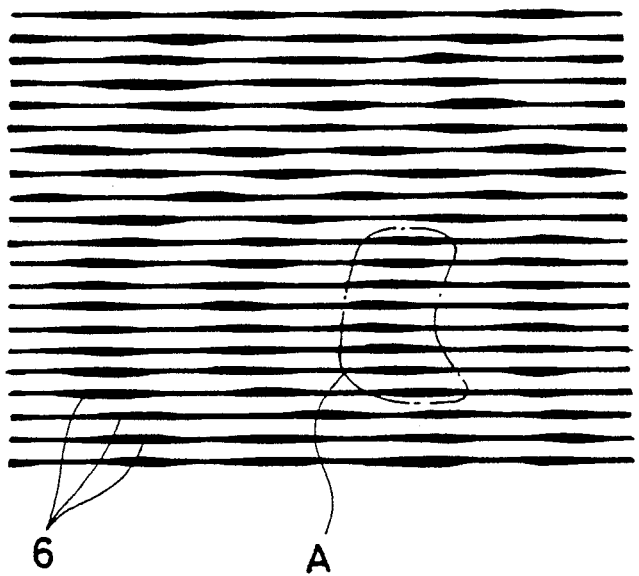
FIG. 4 is a plan view showing an X-ray photograph of a steel belt layer prepared from a plurality of steel cords having the 1×2 twist structure of an S twist.

In the radial tire of the present invention shown in FIG. 1, the reference numeral 1 represents a tread portion, 2 is a sidewall portion continuing from either right or left side of the tread portion 1, and 3 is a bead portion disposed in such a manner as to continue from either right or left sidewall portion 2. A carcass layer 4 is disposed inside the tire in such a manner as to extend over the tread portion 1, the sidewall portions 2 and the bead portions 3, and two steel belt layers are disposed at that portion of the carcass layer 4 corresponding to the tread portion 1 so that their cord directions cross one another.

Each of the steel belt layers 5 is constituted by burying a large number of steel cords having a 1×2 twist structure in parallel with one another into a coating rubber. Two kinds of cords having mutually different twist directions exist in mixture in the steel cord having the 1×2 twist structure. One of them is a steel cord 6 having the 1×2 twist structure wherein two strands 7 are twisted in S twist as shown in FIG. 2A and the other is a steel cord 6 having the 1×2 twist structure in Z twist as shown in FIG. 2B.

In the present invention, the steel belt layer must have a construction such that the steel cords having the 1×2 twist structure of the S twist and the steel cords having the 1×2 twist structure of the Z twist exist in a random mixture. If it consists of the cords having a same twist direction, the rotary motion of the cords which occurs immediately in front of a die at the time of calendering has a same direction and the twist phases occurring between the adjacent cords are likely to be aligned. However, if the S twist cords and the Z twist cords are merely mixed, it is difficult to prevent completely the alignment of the twist phases. Therefore, the twist pitches of the S twist cords and Z twist cords must be made mutually different and moreover, the difference between the twist pitches must be at least 1.5 mm. The twist pitches of these S twist and Z twist cords are preferably within a range of 10 mm to 20 mm.

However, even if two kinds of cords having the mutually different twist directions exist as described above and even if the condition of making different the twist pitches of both kinds of cords is satisfied, the alignment of the twist phases cannot be prevented completely if the number of either the S twist cords or Z twist cords is extremely greater than that of the other inside the steel belt layer. It is therefore preferred that the mixing ratio of both kinds of steel cords is within a range of 4:6 to 6:4 and both kinds of steel cords are disposed at random. More preferably, the mixing ratio of the S twist cords to Z twist cords is 5:5.

In order to arrange at random the S twist cords and the Z twist cords having a mixing ratio of 4:6 to 6:4 as described above, it is advisable to dispose alternately one cord of a same kind or to dispose alternately several (2 to 10) cords of a same kind. It is more preferred to employ an arrangement such that at least one each of the S and Z twist cords always exists inside an arbitrary 15 mm width of the steel belt layer but cords of either one of the two kinds only do not exist inside the 15 mm width described above.

If both kinds of the S and Z twist steel cords are arranged at random in the above described manner, it becomes possible to prevent the twist phases from being aligned between the steel cords over a range of at least 15 mm in the direction of the width of the steel belt layer and to improve the durability of the steel belt layer.

When the steel belt layers for reinforcing the tread portion are constituted by the steel cords having 1×2 twist structure in accordance with the present invention as described above, two kinds of steel cords having the S twist and Z twist are arranged in a random mixture, the mixing ratio between both kinds of steel cords is set to a range of 4:6 to 6:4 and the difference of the twist pitches is set to be at least 1.5 mm. According to this structure, it becomes possible to prevent effectively the twist phases from being aligned between the adjacent cords in the steel belt layer. Thus, the present invention can eliminate the occurrence of an extreme partial difference of the out-plane flexural rigidity, which has otherwise been unavoidable in the steel belt layer using the steel cords of the 1×2 twist structure, and can improve the belt durability.

EXAMPLE

The following three kinds of tires I, II and III were produced. Each tire had the same tire size of 165 SR 13 and the radial structure shown in FIG. 1, and when steel cords having a 1×2 twist structure were used for its steel belt layers, the condition of the steel cords was changed in the following way.

Tire I (Comparative Tire)

The steel belt layer was constituted by use of only one kind of steel cords having a twist pitch of 14 mm and a 1×2 twist structure of S twist.

Tire II (Tire of this Invention)

The steel belt layer was constituted by mixing and disposing alternately one of the steel cords having a twist pitch of 14 mm and a 1×2 twist structure of the S twist and one of the steel cords having a twist pitch of 15.5 mm and a 1×2 twist structure of the Z twist in a mixing ratio of 5:5.

Tire III (Comparative Tire)

The steel belt layer was produced under the same conditions as the Tire II except that the twist pitch of the steel cords of the Z twist in the Tire II was changed to 14 mm which was the same as that of the S twist cords.

When the belt durability test was carried out under the following conditions for these three kinds of Tires I, II and III, the results tabulated in the following table are obtained.

Belt Durability Test

Each test tire was placed on a steel drum with a load of 504 kg and was run at 15 km/hr for 80 hours while being slalomed. Then, the test tire was disintegrated and the number of broken steel cords in the steel belt layer was examined.

|  | mixing ratio of S twist/Z twist | twist pitch difference (mm) | number of broken cords |
|---|---|---|---|
| Tire I | 10/0 | 0 | 80 |
| Tire II | 5/5 | 1.5 | 0 |
| Tire III | 5/5 | 0 | 22 |

As is obvious from the results shown in the table given above, a relatively large number of steel cords were found broken in the steel belt layer of each of the Comparative Tires I and III. In contrast, breakage of the steel cords did not at all occur in the steel belt layer of the Tire II of the present invention.

What is claimed is:

1. A pneumatic radial tire including a belt structure for reinforcing a tread portion, which comprises at least one steel belt layer, each of which is constituted by mixing and arranging at random a plurality of steel cords having a $1 \times 2$ twist structure of an S twist and a plurality of steel cords having a $1 \times 2$ twist structure of a Z twist, and has a mixing ratio of said steel cords having said $1 \times 2$ twist structure of the S twist to said steel cords having said $1 \times 2$ twist structure of the Z twist within a range of 4:6 to 6:4 and a difference in the twist pitche of at least 1.5 mm.

2. A pneumatic radial tire according to claim 1, wherein at least one each of said steel cords having said $1 \times 2$ twist structure of the S twist and said steel cords having said $1 \times 2$ twist structure of the Z twist exists per 15 mm width of said steel belt layer at its arbitrary position.

3. A pneumatic radial tire according to claim 1, wherein the twist pitches of said steel cords having said $1 \times 2$ twist structure of the S twist and said cords having said $1 \times 2$ twist structure of the Z twist are from 10 to 20 mm.

* * * * *